(12) United States Patent
Huber et al.

(10) Patent No.: US 11,767,801 B2
(45) Date of Patent: Sep. 26, 2023

(54) INTERNAL COMBUSTION ENGINE

(71) Applicant: INNIO Jenbacher GmbH & Co OG, Jenbach (AT)

(72) Inventors: Johannes Huber, Kramsach (AT); Tobias Keller, Innsbruck (AT); Josef Thalhauser, Nussdorf (DE); Stefan Koeberl, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/089,492

(22) Filed: Dec. 27, 2022

(65) Prior Publication Data

US 2023/0141267 A1 May 11, 2023

Related U.S. Application Data

(63) Continuation of application No. 17/308,985, filed on May 5, 2021, now Pat. No. 11,536,210.

(30) Foreign Application Priority Data

Apr. 15, 2020 (DE) .......................... 202020102062.5

(51) Int. Cl.
  *F02D 13/06* (2006.01)
  *F02D 41/00* (2006.01)
(52) U.S. Cl.
  CPC ......... *F02D 41/0087* (2013.01); *F02D 13/06* (2013.01); *F02D 41/0007* (2013.01); *F02D 2041/0012* (2013.01)
(58) Field of Classification Search
  CPC ................. F02D 13/06; F02D 41/0087; F02D 2041/0012
  (Continued)

(56) References Cited

U.S. PATENT DOCUMENTS 5,758,616 A   6/1998 Motose
6,877,481 B2  4/2005 Fahringer et al.
(Continued)

FOREIGN PATENT DOCUMENTS

AT   413132 B     11/2005
EP   1225321 A2   7/2002
(Continued)

OTHER PUBLICATIONS

German Search Report; DE Application No. 20 2020 102 062.5; dated Feb. 1, 2021; 8 pages.
(Continued)

*Primary Examiner* — Erick R Solis
(74) *Attorney, Agent, or Firm* — Fletcher Yoder, P.C.

(57) ABSTRACT

An internal combustion engine (1) operating in cycles, having:
  a plurality of piston-cylinder units (2), wherein each piston-cylinder unit (2) of the plurality of piston-cylinder units (2) is assigned an ignition device (3) which can be controlled regarding activation and selection of an ignition timing by an engine control (4), wherein a piston-cylinder unit (2), when the ignition device (3) is activated, produces a power by combustion of a gas-air mixture, which can be transmitted as a torque to a crankshaft (5) of the internal combustion engine (1)
  an intake stroke (6) and an exhaust stroke (7), each coupled to the plurality of piston-cylinder units (2)
  a supply device (8) for supplying a gas-air mixture under a boost pressure to the intake stroke (6)
  a signal detection device (9) for acquiring at least one signal which represents a power demand on the internal combustion engine (1) or from which a power demand on the internal combustion engine (1) can be calculated
(Continued)

an engine control (4) for actuating actuators of the internal combustion engine (1), wherein the at least one signal can be fed to the engine control (4), and the engine control (4) is configured in a first operating mode to leave as many ignition devices (8) deactivated per cycle of the internal combustion engine in dependence on the currently present power demand, that the power of those piston-cylinder units (2), the ignition devices (8) of which are activated, results in a torque of the crankshaft (5) of the internal combustion engine (1) adapted to the currently present power demand wherein the engine control (4) is configured to, in a second operating mode, for reducing a risk of deflagration due to unburned gas-air mixture present in the exhaust stroke (7)

after a first number ($N_1$) of cycles of the internal combustion engine (1), for a second number ($N_2$) of cycles of the internal combustion engine (1), to have more piston-cylinder units (2) produce power per cycle by activating the assigned ignition devices (8) than would be required for the currently present power demand after the second number ($N_2$) of cycles of the internal combustion engine (1), for a third number ($N_3$) of cycles of the internal combustion engine (1), in dependence on a currently present power demand per cycle of the internal combustion engine (1), to have so many piston-cylinder units (2) produce power by activation of the assigned ignition devices (8) that this results in a torque of the crankshaft (5) adapted to the currently present power demand.

20 Claims, 4 Drawing Sheets

(58) Field of Classification Search
USPC .............................................. 123/198 F, 481
See application file for complete search history.

(56) References Cited

U.S. PATENT DOCUMENTS

| | | | |
|---|---|---|---|
| 9,382,855 | B2 | 7/2016 | Fahringer et al. |
| 9,790,881 | B2 | 10/2017 | Kopecek et al. |
| 10,305,404 | B2 | 5/2019 | Pendray et al. |
| 10,385,787 | B2 | 8/2019 | Kopecek et al. |
| 2002/0117859 | A1 | 8/2002 | Kraus et al. |
| 2003/0172892 | A1* | 9/2003 | Glugla ............... F02B 75/22 |
| | | | 123/179.5 |
| 2017/0152781 | A1* | 6/2017 | Free ................ F01N 13/011 |
| 2019/0136771 | A1* | 5/2019 | Engfehr ............ F02D 41/009 |
| 2019/0242309 | A1 | 8/2019 | Mohammed et al. |
| 2020/0232403 | A1 | 7/2020 | Ottikkutti et al. |

FOREIGN PATENT DOCUMENTS

| | | |
|---|---|---|
| EP | 2526279 A1 | 11/2012 |
| EP | 2952712 A1 | 12/2015 |
| EP | 2955355 A1 | 12/2015 |

OTHER PUBLICATIONS

European Extended Search Report for EP Application No. 21163467.0 dated Sep. 7, 2022; 8 pgs.

Canadian Office Action for CA Application No. 3,114,840 dated Sep. 8, 2022; 4 pgs.

* cited by examiner

INTERNAL COMBUSTION ENGINE

CROSS-REFERENCE TO RELATED APPLICATION

This application is a continuation of U.S. Ser. No. 17/308,985, entitled "INTERNAL COMBUSTION ENGINE," filed on May 5, 2021, which issued as U.S. Pat. No. 11,536,210 on Dec. 27, 2022, and which claims benefit and priority to German Utility Model Application No. DE202020102062.5, filed on Apr. 15, 2020; entitled "Internal Combustion Engine", which is herein incorporated by reference in its entirety.

BACKGROUND

The present invention concerns an internal combustion engine operating in cycles and having the features of the preamble of claim 1, and a genset comprising such an internal combustion engine.

Internal combustion engines require the power of the engine to be controlled or regulated by means of an engine control. With stationary internal combustion engines in particular, it is often undesirable to change the power by actuating an actuator in the form of closing a throttle valve, because this can reduce the efficiency of the internal combustion engine. For this reason, control or regulating concepts are implemented wherein individual, several or all ignition devices of the piston-cylinder units of an internal combustion engine are temporarily deactivated, i.e. not ignited. This is known by the term "skip firing". In particular for the stationary operation of an internal combustion engine, shutdown patterns are disclosed in EP 2 952 712 A1 and EP 2 955 355 A1, which are intended to promote a thermally homogeneous state of the internal combustion engine.

Mixture-charged internal combustion engines are understood to be those engines wherein a gas-air mixture is fed into the combustion chambers of the piston-cylinder units (with or without the use of a turbocharger), instead of a separate feed of fuel and air. In the present disclosure, gas is understood to mean a gaseous fuel (also referred to as propellant gas), for instance natural gas.

In the context of the present disclosure, load sheddings refer to events in which a relatively large portion of the power demand on the internal combustion engine disappears for a short period of time.

For instance, load shedding in rotational speed-controlled operation in an isolated grid or during the transition to idle mode corresponds to a reduction of the electrical load on the generator and an accompanying rapid reduction of the load torque on the crankshaft. Due to the drive torque continuing to exist, this leads to an increase in the rotational speed of the crankshaft and all connected rotating parts. In order to keep the rotational speed within the desired permissible limits, it is necessary to react as quickly as possible using all available actuators of the internal combustion engine which can reduce the drive torque. Besides a favorable influence on boost pressure, fuel-air ratio and ignition timing, the skip firing method is an effective measure for quickly reducing the drive torque.

Problems with skip firing can occur in the case of mixture-charged internal combustion engines in the context of so-called load sheddings, as in the case of mixture-charged internal combustion engines the supply of fuel cannot be switched off individually for each combustion chamber. If a large proportion of the power demand is lost during load shedding, a correspondingly large number of piston-cylinder units must remain unignited.

This first of all results in gas-air mixture also reaching the combustion chambers of those piston-cylinder units that are not ignited by the assigned ignition device in the context of skip firing. Subsequently, unburned gas-air mixture enters the exhaust stroke, and uncontrolled combustion of the gas-air mixture can occur either still in the combustion chamber or in parts of the exhaust stroke, which is of course harmful. Another potential negative consequence can be that the gas-air mixture enters a catalyst placed in the exhaust stroke, and damages or displaces the catalyst. These negative consequences are more likely and more frequent in the case of load shedding, so that the risk of damage to the machine due to skip firing is particularly high in the case of load shedding.

Load sheddings can occur, for instance, in internal combustion engines that use their crankshaft to drive an electrical generator to produce electrical energy. Such an arrangement is also referred to as a "genset".

The object of the present invention is to reduce the risk of uncontrolled combustion of gas-air mixture in the combustion chambers and/or exhaust stroke of a generic internal combustion engine and a generic genset when using skip firing to compensate for load sheddings in mixture-charged internal combustion engines.

This object is solved by an internal combustion engine operating in cycles with the features of claim 1 and a genset with such an internal combustion engine. Advantageous embodiments of the invention are defined in the dependent claims.

BRIEF DESCRIPTION

An internal combustion engine according to the invention comprises:
- a plurality of piston-cylinder units, wherein each piston-cylinder unit of the plurality of piston-cylinder units is assigned an ignition device which can be controlled by an engine control with regard to activation and selection of an ignition timing, wherein a piston-cylinder unit, when the ignition device is activated, produces a power by combustion of a gas-air mixture, which power can be transmitted as a torque to a crankshaft of the internal combustion engine
- an intake stroke and an exhaust stroke, each coupled with the plurality of piston-cylinder units
- a supply device for supplying a gas-air mixture under a boost pressure to the intake stroke
- a signal detection device for acquiring at least one signal which represents a power demand on the internal combustion engine or from which a power demand on the internal combustion engine can be calculated
- an engine control for controlling actuators of the internal combustion engine, wherein the at least one signal can be fed to the engine control, and the engine control is configured in a first operating mode to leave so many ignition devices deactivated per cycle of the internal combustion engine dependent on the power demand currently present that the power of those piston-cylinder units, whose ignition devices are activated, results in a torque of the crankshaft of the internal combustion engine adapted to the power demand currently present
- an engine control configured to, in a second operating mode, reduce a risk of deflagration due to unburned gas-air mixture present in the exhaust stroke after a first number of cycles of the internal combustion engine, for a second number of cycles of the internal combustion engine, to have more piston-cylinder units produce power per cycle by activating the assigned ignition devices than would be required for the currently present power demand after the second number of cycles of the internal combustion engine, for a third number of cycles of the internal combustion engine, depending on a currently present power demand, to have so many piston-cylinder units produce power per cycle of the internal combustion engine by activating the assigned ignition devices that a torque of the crankshaft adapted to the currently present power demand is obtained In the invention, the unburned gas-air mixture entering the exhaust stroke during the first number and the third number of cycles during skip firing is diluted with exhaust gas during the second number of cycles, since more gas-air mixture is burned during the second number of cycles due to (compared to the first number of cycles) an increased number of activated ignition devices, and thus more exhaust gas is produced, which mixes with unburned gas-air mixture in the exhaust stroke, so that the probability and frequency of the negative consequences of uncontrolled combustion mentioned earlier are reduced. The engine control system can determine how many and which ignition devices are to be deactivated in a way known from prior art.

If, during the second number of cycles, the engine control actuates at least one actuator of the internal combustion engine to reduce the power produced by a piston-cylinder unit with the ignition device activated, another advantage of the invention is that the risk of knocking when load shedding occurs can be reduced.

The term cycle of an internal combustion engine operating in cycles is understood to mean an operation cycle of the internal combustion engine, i.e. in the case of a four-stroke engine a rotation of the crankshaft with a crankshaft angle of 720°, or in the case of a two-stroke engine a rotation of the crankshaft with a crankshaft angle of 360°.

As already mentioned, load sheddings are events in which a significant part of the power demand on the internal combustion engine in rotational speed-controlled operation suddenly ceases. In particular, we can speak of load sheddings when more than 30%, preferably 100%, of the power demand suddenly ceases.

If with a genset, the electrical energy is fed into a power grid and a grid fault occurs, the energy can no longer be fed into the grid, resulting in a sudden reduction in the power demand on the internal combustion engine. Another case can occur in so-called island operation, when the electrical energy is not fed into a power grid, but is used directly to drive individual or a few consumers (e.g. pumps, etc.). Load shedding occurs then when one or more of the recipients are suddenly switched off.

The ignition devices of the individual piston-cylinder units may include a spark plug protruding into a combustion chamber of the piston-cylinder unit. If the piston-cylinder units have a prechamber and a main combustion chamber connected to the prechamber, the spark plug can be arranged in the prechamber.

As already mentioned, the invention relates to internal combustion engines which include a supply device coupled to the intake stroke for the joint supply of gas and air (mixture-charged internal combustion engines). Usually, a mixing device for mixing gas and air is used for this purpose.

Suspension of an ignition event is, of course, understood to mean that the ignition device assigned to a piston-cylinder unit is not activated or is deactivated while there is gas-air mixture in the combustion chamber and, therefore, ignition of the gas-air mixture would actually be necessary for the piston-cylinder unit to produce power.

In one embodiment of the invention, the engine control is configured to switch from the first operating mode to the second operating mode when a predetermined first criterion is met—preferably when a reduction in the power demand (and/or its rate of change) exceeds a predetermined limit value occurs. Thereby, it is preferably provided that the engine control is configured to switch from the second operating mode to the first operating mode depending on the fulfillment of a predeterminable second criterion.

The first criterion can be, for instance, a number of piston-cylinder units with deactivated ignition device and/or a duration of skip firing. The higher the number of piston-cylinder units with deactivated ignition device and the more cycles the skip firing lasts, the higher is the risk of uncontrolled combustion of gas-air mixture in the exhaust stroke.

The second criterion can be a predetermined number of repetitions of the first, second and third number of cycles of the internal combustion engine and/or an increase in the power demand (and/or its rate of change)—either measured directly or determined indirectly (e.g. via the rotational speed (change)) by a predetermined amount.

In one embodiment of the invention, the engine control is configured to repeat the sequence of the first number, second number, and third number of cycles of the internal combustion engine in the second operating mode, for instance until the second criterion discussed in the previous paragraph is met.

In one embodiment of the invention, the engine control is configured to perform, in the second operating mode, a control of at least one actuator for reducing the power produced by a piston-cylinder unit with activated ignition device, preferably by reducing the boost pressure in the intake stroke. This is preferably done by an actuator:

in the form of a throttle valve arranged in or in front of the intake stroke, wherein preferably a boost pressure-dependent limit value is provided for a minimum closed position of the throttle valve, and it is provided that the throttle valve is actuated in such a way that a closed position of the throttle valve remains at or above the limit value, and/or in the form of a blow-by valve of a turbocharger arranged in or in front of the intake stroke The load pressure-dependent limit value for a minimum closed position of the throttle valve serves to avoid compressor-surge during load shedding.

In one embodiment of the invention, the engine control system is configured to perform a control of at least one actuator for reducing the power produced by a piston-cylinder unit with activated ignition device in the second operating mode by performing an adjustment of the ignition timing to late for at least one of the piston-cylinder units with activated ignition device. An adjustment of the ignition timing by a value between 0° and 30°, can for instance be set to a resulting pre-set ignition timing between 0° and 20° and preferably between 0° and 10°, before the top dead center of a piston of the piston-cylinder unit concerned.

In one embodiment of the invention, the engine control system is configured to not reduce the power produced by a piston-cylinder unit with the ignition device activated in the second operating mode for the third number of cycles of the internal combustion engine. So, in this embodiment, the power of the piston-cylinder units producing power is not reduced during the first and third number of cycles of the internal combustion engine.

In all embodiments of the invention, it may be provided that
- the third number of cycles of the internal combustion engine is equal to the first number of cycles of the internal combustion engine and/or
- the second number of cycles of the internal combustion engine is smaller than the first number and/or the third number of cycles of the internal combustion engine.

For instance, the first number can be equal to the third number equal to three, and the second number can be equal to one. Thereby, it is particularly preferably provided to actuate all ignition devices during the one cycle of the second number.

The second number should always be higher than zero, the first number and/or the third number could be chosen equal to zero.

In one embodiment of the invention, it is provided that the first number of cycles of the internal combustion engine and/or the second number of cycles of the internal combustion engine and/or the number of cycles of the internal combustion engine are dependent on the at least one signal from the signal detection device.

In one embodiment of the invention, the engine control is configured to, in the second operating mode for the second number of cycles of the internal combustion engine:
- activate all ignition devices and/or
- for a plurality, preferably for all, of the piston-cylinder units with activated ignition device, to adjust the ignition timing to late.

In all embodiments of the invention, it may be provided that the at least one signal of the signal detection device is a rotational speed signal representing a rotational speed of the crankshaft.

The signal detection device can, for instance, be a rotational speed sensor that measures a rotational speed of the crankshaft. However, the rotational speed of the crankshaft can also be determined indirectly as known in the prior art.

BRIEF DESCRIPTION OF THE DRAWINGS

An embodiment of the invention is discussed with reference to the figures.

DETAILED DESCRIPTION

Figure 1:
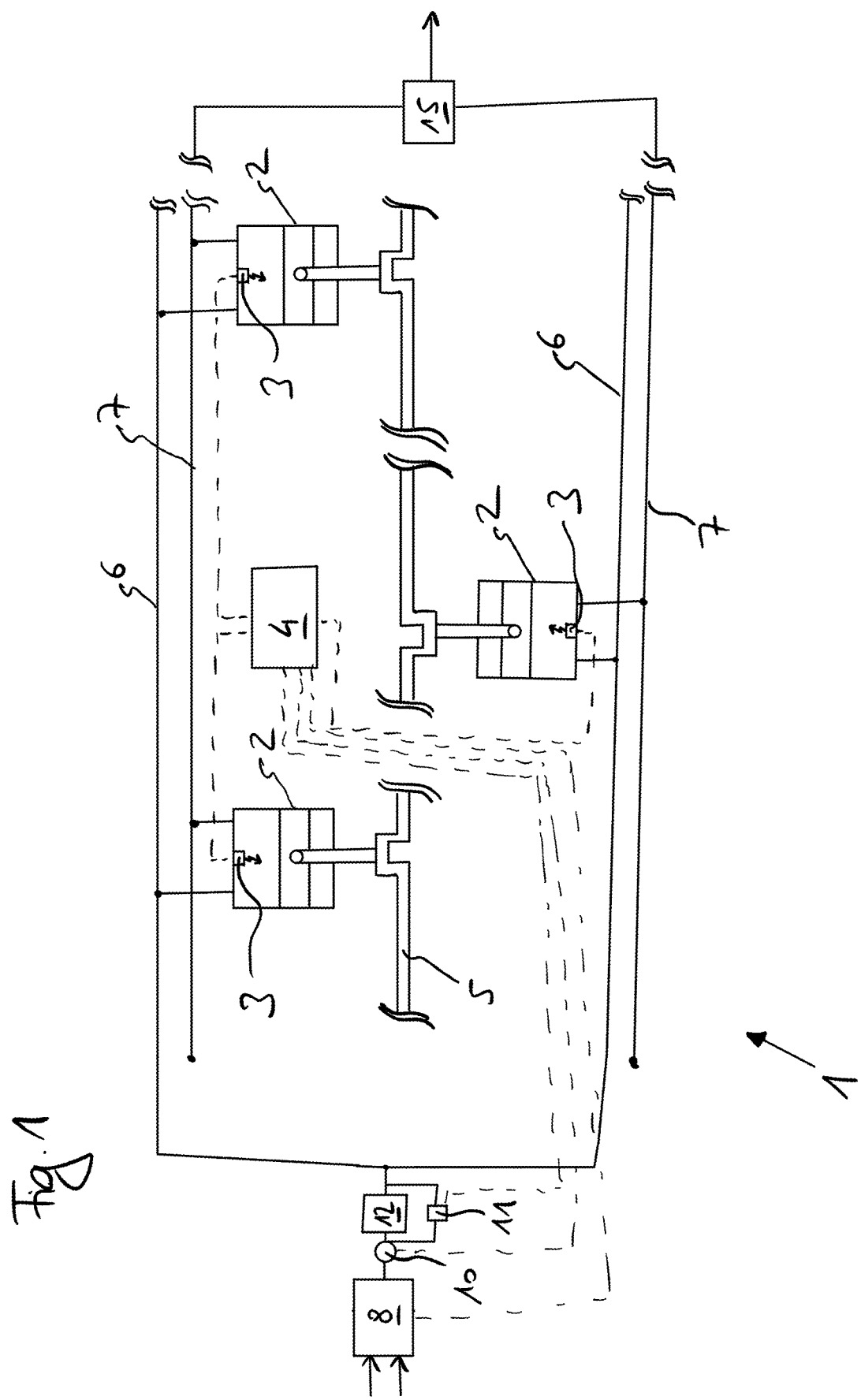
FIG. 1 schematically shows an internal combustion engine according to the invention.

FIG. 1 shows an internal combustion engine 1 according to the invention with a plurality of piston-cylinder units 2, wherein each piston-cylinder unit 2 is assigned an ignition device 3, which is controllable in terms of activation and selection of an ignition timing by an engine control 4, wherein a piston-cylinder unit 2, when the ignition device 3 is activated, produces power by combustion of a gas-air mixture, which power is transmittable as torque to a crankshaft 5 of the internal combustion engine 1.

The internal combustion engine further comprises:
- an intake stroke 6 and an exhaust stroke 7, each coupled to the plurality of piston-cylinder units 2, wherein an optional catalyst 15 is arranged in the exhaust stroke 7
- a supply device 8 for supplying a gas-air mixture under a boost pressure to the intake stroke 6
- a signal detection device 9 for acquiring at least one signal which represents a power demand on the internal combustion engine 1 or from which a power demand on the internal combustion engine 1 can be calculated (here, the at least one signal of the signal detection device 9 is a rotational speed signal representing a rotational speed n of the crankshaft 5)

The engine control 4 is used to control actuators of the internal combustion engine 1 (in the context of an open or closed control loop), wherein the at least one signal is feedable to the engine control 4, and the engine control 4 is configured in a first operating mode to leave so many ignition devices 3 deactivated per cycle of the internal combustion engine 1 depending on the currently present power demand, that the power of those piston-cylinder units 2, whose ignition devices 3 are activated, results in a torque of the crankshaft 5 of the internal combustion engine 1 adapted to the currently present power demand.

The engine control 4 is further configured to, in a second operating mode for reducing a risk of deflagration due to unburned gas-air mixture present in the exhaust stroke 7
- after a first number N1 of cycles of the internal combustion engine 1, for a second number N2 of cycles of the internal combustion engine 1, to have more piston-cylinder units 2 per cycle produce power by activating the assigned ignition devices 3 than would be required for the currently present power demand, and preferably thereby to control at least one actuator of the internal combustion engine 1 for reducing the power produced by a piston-cylinder unit 2 with activated ignition device 3
- after the second number N2 of cycles of the internal combustion engine 1, for a third number N3 of cycles of the internal combustion engine 1, depending on a currently present power demand, to have so many piston-cylinder units 2 produce power per cycle of the internal combustion engine 1 by activating the assigned ignition devices 3 that a torque of the crankshaft 5 is obtained, which is adapted to the currently present power demand.

The engine control 4 is further configured to switch from the first operating mode to the second operating mode when a predetermined first criterion is met—preferably when a change in the power demand and/or its rate of change exceeds a predetermined limit value. Thereby, it is preferably provided that the engine control 4 is configured to change from the second operating mode to the first operating mode depending on the fulfillment of a predeterminable second criterion.

The engine control 4 is configured to repeat the sequence of the first number N1, second number N2 and third number N3 of cycles of the internal combustion engine 1 in the second operating mode.

The engine control system 4 is configured so as to carry out activation of at least one actuator in the second operating mode for reducing the power produced by a piston-cylinder unit 2 with activated ignition device 3 by lowering the boost pressure in the intake stroke 6, in this case by means of an actuator:
- in the form of a throttle valve 10 arranged in or in front of the intake stroke 6, wherein preferably a boost pressure-dependent limit value is provided for a minimum closed position of the throttle valve 10, and it is provided that the throttle valve 10 is actuated in such a way that a closed position of the throttle valve 10 remains at or above the limit value, and/or in the form of a blow-by valve 11 of a turbocharger 12 arranged in or in front of the intake stroke 6.

The engine control 4 is configured so as to carry out controlling of at least one actuator for reducing the power produced by a piston-cylinder unit 2 with activated ignition device 3 in the second operating mode, by adjusting the ignition timing to late for at least one of the piston-cylinder units 2 with activated ignition device 3.

The engine control 4 is configured so as not to reduce, in the second operating mode for the third number N3 of cycles of the internal combustion engine 1, the power produced by a piston-cylinder unit 2 with activated ignition device 3.

The engine control 4 is configured so as to activate all ignition devices 3 in the second operating mode for the second number N2 of cycles of the internal combustion engine 1, and/or to carry out an adjustment of the ignition timing to late for a plurality, preferably for all, of the piston-cylinder units 2 with activated ignition device 3.

Figure 2:
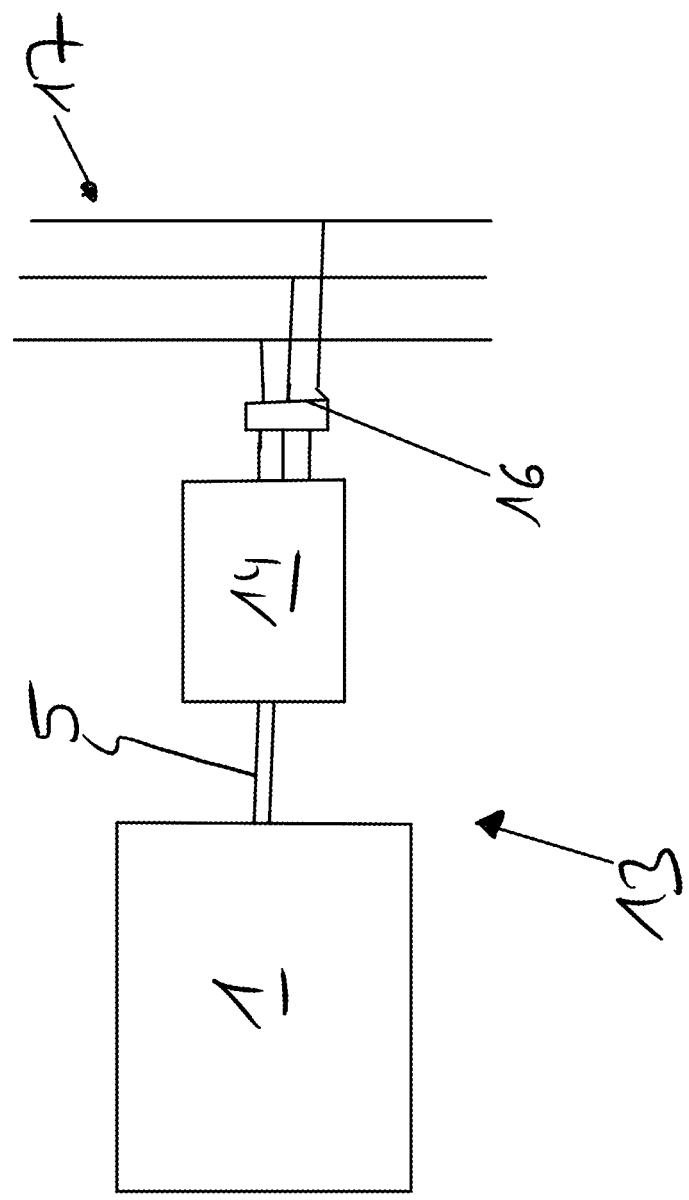
FIG. 2 schematically shows a genset according to the invention.

FIG. 2 shows the internal combustion engine 1 of FIG. 1 as part of a genset 13 with an electrical generator 14 mechanically coupled to the crankshaft 5 of the internal combustion engine 1. The power demand on the internal combustion engine 1 results from a load which can be connected or is connected to the electrical generator 14 via a switching device 16 (shown here in the form of a three-phase power grid 17).

Figure 3:
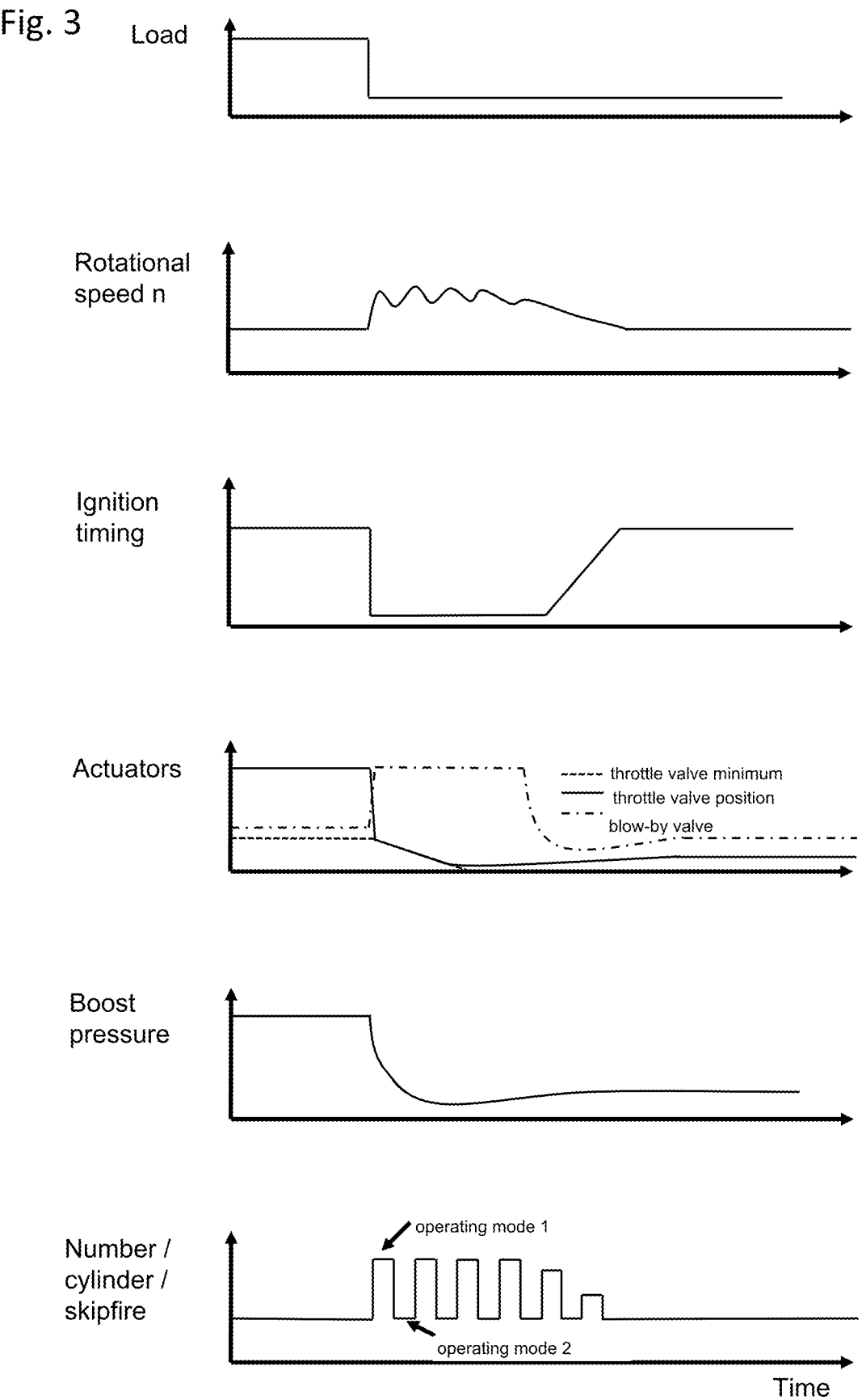
FIG. 3 schematically shows an exemplary procedure in the case of load shedding according to a first embodiment.
Figure 4:
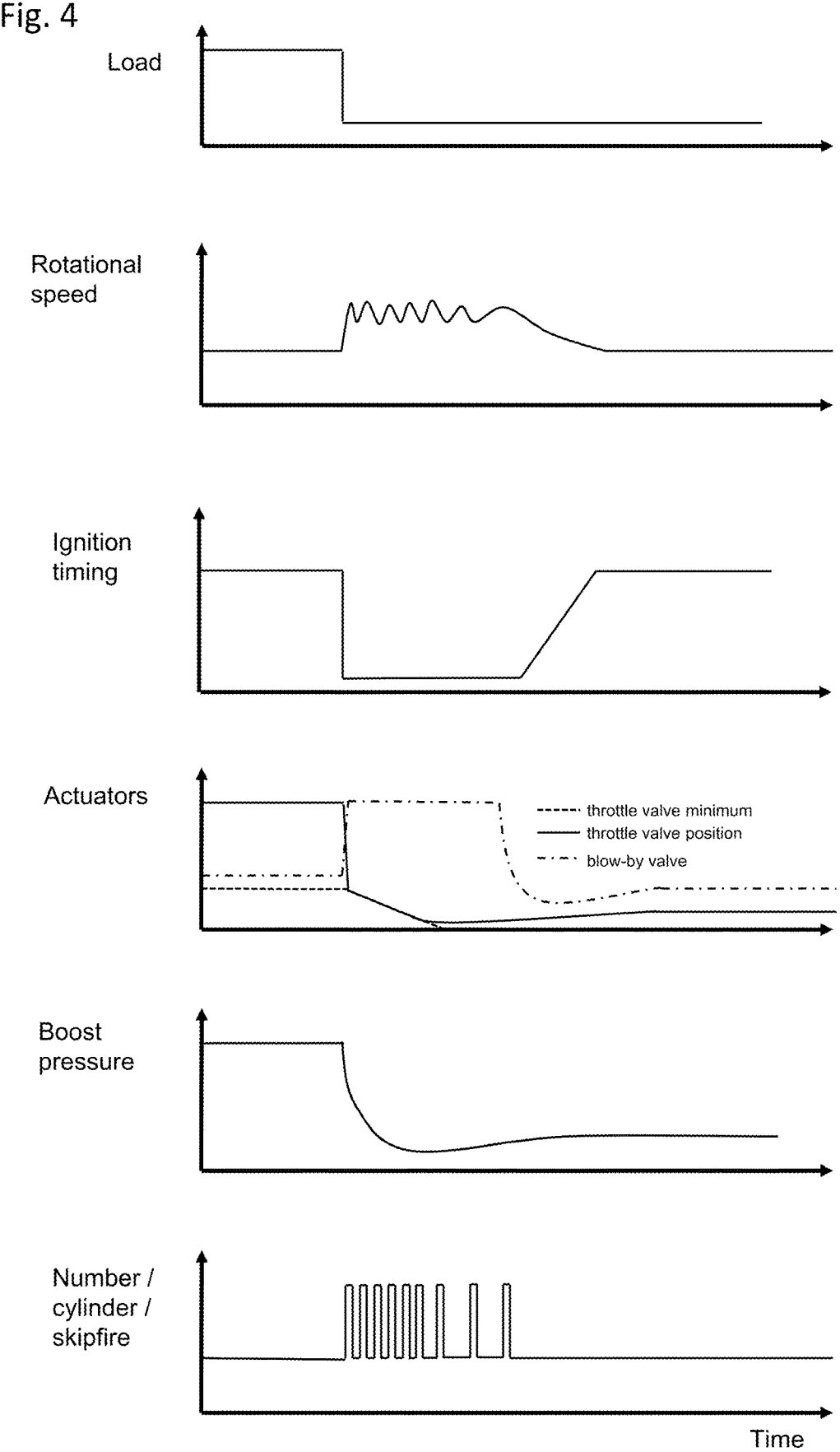
FIG. 4 schematically shows an exemplary procedure in the case of load shedding according to a second embodiment.

Those events that lie along a line in the different graphs of FIGS. 3 and 4, as viewed vertically, take place at the same time.

FIG. 3 shows how the second operating mode is performed during load shedding in a first embodiment.

In the top graph "load over time" of FIG. 3, the power demand on the internal combustion engine 1 is first at a certain level, and the engine control 4 is in the first operating mode, in which it is configured so as to leave so many ignition devices 3 deactivated per cycle of the internal combustion engine 1, depending on the power demand currently present, that the power of those piston-cylinder units 2 whose ignition devices 3 are activated, results in a torque of the crankshaft 5 of the internal combustion engine 1 adapted to the power demand currently present. Depending on the power demand, the number of deactivated ignition devices 3 may be zero or greater than zero.

At a certain point in time, the power demand on internal combustion engine 1 suddenly collapses, which is shown in the graph "load over time" by a sudden reduction of the load.

In the present embodiment, the occurrence of the change in power demand exceeding a predetermined limit value (either measured directly or detected via an increase in rotational speed) triggers a change in the operating mode of the engine control 4 from the first operating mode to the second operating mode.

In this second operating mode, such a number of ignition devices 3 are first deactivated for a number N1 of cycles that the increase n in rotational speed is limited (this produces the first maximum in the graph "rotational speed n over time"). After the number N1 of cycles, the engine control 4 allows more piston-cylinder units 2 per cycle to provide power by activating the assigned ignition devices 3 for a second number N2 of cycles than would be required for the currently present power demand. Although this results in a renewed increase in rotational speed n, the risk of uncontrolled deflagration is reduced. The number N3 is selected to be zero in this embodiment.

This sequence of N1 cycles and N2 cycles is repeated three times here as an example. Then, two sequences of N1 cycles and N2 cycles follow, in each of which fewer ignition devices 3 are deactivated during the N1 cycles of a sequence than during the N1 cycles of the immediately preceding sequence. The numbers N1 and N2 of cycles do not change in this embodiment. Then the engine control 4 changes again to the first operating mode.

The graphs "ignition timing over time", "actuators over time" and "boost pressure over time" show optional flanking measures (these do not all have to be carried out together, although this is imaginable) for controlling at least one actuator to reduce the power produced by a piston-cylinder unit 2 with activated ignition device 3, in this case adjusting the ignition timings to late and/or influencing the boost pressure by changing the position of a throttle valve and/or actuating a blow-by valve. Due to the lowering of the boost pressure, the number of deactivated ignition devices 3 in the first operating mode before and after the changes in the power demand can be the same (not mandatory), e.g. equal to zero, since the lower load is taken into account by the lowered boost pressure.

FIG. 4 shows how, in a load shedding in a second embodiment, the second operating mode is carried out, wherein here, in contrast to the embodiment of FIG. 3, the numbers N1 and N2 of cycles are not necessarily kept constant, but are changed over time, e.g. depending on the at least one signal of the signal detection device 9.

LIST OF REFERENCE SIGNS 1 internal combustion engine
2 piston-cylinder unit
3 ignition device
4 engine control
5 crankshaft
6 intake stroke
7 exhaust stroke
8 supply device for gas-air mixture
9 signal detection device
10 throttle valve
11 blow-by valve
12 turbocharger
13 genset
14 electrical generator
15 catalyst
16 switching device
17 power grid
$N_1$ first number of cycles
$N_2$ second number of cycles
$N_3$ third number of cycles
n crankshaft rotational speed

The invention claimed is:
1. A system, comprising:
a controller configured to control a power output of an internal combustion engine having a plurality of combustion chambers associated with a respective plurality of piston-cylinder assemblies, wherein the controller is configured to:
control an ignition to skip firing in at least one combustion chamber of the plurality of combustion chambers for a first number of cycles;

control the ignition to fire in the at least one combustion chamber of the plurality of combustion chambers for a second number of cycles after the first number of cycles; and control at least one actuator to reduce a power produced by firing in the at least one combustion chamber of the plurality of combustion chambers during the second number of cycles.

2. The system of claim 1, wherein the controller is configured to control the at least one actuator to reduce the power produced by at least:

adjusting an ignition timing to a late setting for the at least one combustion chamber firing during the second number of cycles.

3. The system of claim 2, wherein the late setting of the ignition timing comprises a value between 0° and 30° before a piston of the at least one combustion chamber reaches a top dead center (TDC) position.

4. The system of claim 1, wherein the controller is configured to control the at least one actuator to reduce the power produced by at least:

lowering a boost pressure in an intake stroke for the at least one combustion chamber firing during the second number of cycles.

5. The system of claim 4, wherein lowering the boost pressure in the intake stroke comprises at least partially closing a throttle valve.

6. The system of claim 4, wherein lowering the boost pressure in the intake stroke comprises at least partially bypassing a turbocharger of the internal combustion engine.

7. The system of claim 1, wherein the controller is configured to switch operation of the internal combustion engine between a first operating mode and a second operating mode in response to a change in a power demand and/or a rate of change in the power demand exceeding a threshold limit value, wherein the second operating mode includes at least a sequence of the first and second cycles.

8. The system of claim 1, wherein the controller is configured to repeat a sequence of the first and second number of cycles.

9. The system of claim 8, wherein the controller is configured to change the first number of cycles and/or the second number of cycles when repeating the sequence.

10. The system of claim 1, wherein the first number of cycles is greater than the second number of cycles.

11. The system of claim 10, wherein the first number of cycles is three and the second number of cycles is one.

12. The system of claim 1, wherein, during the second number of cycles, the controller is configured to control the ignition to fire in a first number of combustion chambers of the plurality of combustion chambers greater than needed to meet a power demand, and the controller is configured to control the at least one actuator to reduce the power produced by the first number of combustion chambers based on the power demand.

13. The system of claim 12, wherein, during a third number of cycles, the controller is configured to control the ignition to fire in a second number of combustion chambers of the plurality of combustion chambers adapted to meet the power demand.

14. The system of claim 13, wherein the controller is configured to not reduce the power produced by firing the second number of combustion chambers during the third number of cycles.

15. The system of claim 1, comprising the internal combustion engine having the plurality of piston-cylinder assemblies.

16. A method, comprising:

controlling a power output of an internal combustion engine having a plurality of combustion chambers associated with a respective plurality of piston-cylinder assemblies, wherein controlling the power output comprises:

controlling an ignition to skip firing in at least one combustion chamber of the plurality of combustion chambers for a first number of cycles;

controlling the ignition to fire in the at least one combustion chamber of the plurality of combustion chambers for a second number of cycles after the first number of cycles; and controlling at least one actuator to reduce a power produced by firing in the at least one combustion chamber of the plurality of combustion chambers during the second number of cycles.

17. The method of claim 16, wherein controlling the at least one actuator to reduce the power produced by firing comprises:

adjusting an ignition timing to a late setting for the at least one combustion chamber firing during the second number of cycles.

18. The method of claim 16, wherein controlling the at least one actuator to reduce the power produced by firing comprises:

lowering a boost pressure in an intake stroke for the at least one combustion chamber firing during the second number of cycles.

19. The method of claim 16, wherein controlling the power output comprises switching operation of the internal combustion engine between a first operating mode and a second operating mode in response to a change in a power demand and/or a rate of change in the power demand exceeding a threshold limit value, wherein the second operating mode includes at least a sequence of the first and second cycles.

20. A system, comprising:

an internal combustion engine having at least one combustion chamber associated with a respective piston-cylinder assembly; and a controller configured to control a power output of the internal combustion engine, wherein the controller is configured to:

control an ignition to skip firing in the least one combustion chamber for a first number of cycles;

control the ignition to fire in the at least one combustion chamber for a second number of cycles after the first number of cycles; and control at least one actuator to reduce a power produced by firing in the at least one combustion chamber during the second number of cycles.

* * * * *